United States Patent
Duffy et al.

(10) Patent No.: US 9,251,207 B2
(45) Date of Patent: Feb. 2, 2016

(54) PARTITIONING AND REPARTITIONING FOR DATA PARALLEL OPERATIONS

(75) Inventors: John Duffy, Renton, WA (US); Edward G. Essey, Seattle, WA (US); Charles D. Callahan, II, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 514 days.

(21) Appl. No.: 11/947,558

(22) Filed: Nov. 29, 2007

(65) Prior Publication Data

US 2009/0144346 A1   Jun. 4, 2009

(51) Int. Cl.
*G06F 7/00* (2006.01)
*G06F 17/30* (2006.01)

(52) U.S. Cl.
CPC .... *G06F 17/30445* (2013.01); *G06F 17/30486* (2013.01)

(58) Field of Classification Search
CPC .................................................. G06F 17/30445
USPC ........................................................ 707/714
See application file for complete search history.

(56) References Cited

U.S. PATENT DOCUMENTS

| | | | |
|---|---|---|---|
| 5,822,608 A * | 10/1998 | Dieffenderfer et al. | ......... 712/20 |
| 5,857,180 A | 1/1999 | Hallmark et al. | |
| 6,003,036 A * | 12/1999 | Martin | |
| 6,112,198 A | 8/2000 | Lohman et al. | |
| 6,240,428 B1 | 5/2001 | Yeung et al. | |
| 6,609,131 B1 | 8/2003 | Zait et al. | |
| 6,625,593 B1 | 9/2003 | Leung et al. | |
| 7,085,769 B1 | 8/2006 | Luo et al. | |
| 2004/0122845 A1 | 6/2004 | Lohman et al. | |
| 2006/0218123 A1 | 9/2006 | Chowdhuri et al. | |
| 2008/0162409 A1 * | 7/2008 | Meijer et al. | ...................... 707/2 |

OTHER PUBLICATIONS

Chaturvedi, et al., "SQL Server 7.0 on Deck", http://www.dbpd.com/vault/9807chat.htm.

Celts, et al., "The Query Execution Engine in Tandem's new Serverware SQL Product", Fourth International Conference on Parallel and Distributed Information Systems, Date: Dec. 18-20, 1996, pp. 289-291.

Dewitt, et al., "Multiprocessor Hash-Based Join Algorithms", pp. 1-21.

Taniar, et al., "Aggregate—Join Query Processing in Parallel Database Systems", Proceedings of the Fourth International Conference/Exhibition on High Performance Computing in the Asia-Pacific Region, Date: 2000, vol. 2, pp. 824-829.

* cited by examiner

*Primary Examiner* — Ajith Jacob
(74) *Attorney, Agent, or Firm* — Kevin Sullivan; Doug Barker; Micky Minhas

(57) ABSTRACT

A query that identifies an input data source is rewritten to contain data parallel operations that include partitioning and merging. The input data source is partitioned into a plurality of initial partitions. A parallel repartitioning operation is performed on the initial partitions to generate a plurality of secondary partitions. A parallel execution of the query is performed using the secondary partitions to generate a plurality of output sets. The plurality of output sets are merged into a merged output set.

20 Claims, 10 Drawing Sheets

PARTITIONING AND REPARTITIONING FOR DATA PARALLEL OPERATIONS

BACKGROUND

Software programs have been written to run sequentially since the beginning days of software development. Steadily over time, computers have become much more powerful, with more processing power and memory to handle advanced operations. This trend has recently shifted away from ever-increasing single-processor clock rates towards an increase in the number of processors available in a single computer resulting in a corresponding shift away from sequential execution toward parallel execution. Software developers want to take advantage of improvements in computer processing power to enable their software programs to run faster as new hardware is adopted. With parallel hardware, software developers arrange for one or more tasks of a particular software program to be executed in parallel (also referred to as concurrently), so that the same logical operation can utilize many processors at one time to thereby deliver better performance as more processors are added to the computers on which such software runs.

When parallelizing previously-written sequential algorithms, it is often desirable to keep as much of the previous sequential program behavior as possible. However, typical parallel execution of existing sequential logic introduces new behavioral characteristics and presents problems that can introduce challenges into the migration from sequential to parallel algorithms.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In one embodiment, a query that identifies an input data source is rewritten to contain data parallel operations that include partitioning and merging. The input data source is partitioned into a plurality of initial partitions. A parallel repartitioning operation is performed on the initial partitions to generate a plurality of secondary partitions. A parallel execution of the query is performed using the secondary partitions to generate a plurality of output sets. The plurality of output sets are merged into a merged output set.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment provides an application that performs dynamic partitioning and repartitioning for data parallel operations, but the technologies and techniques described herein also serve other purposes in addition to these. In one implementation, one or more of the techniques described herein can be implemented as features within a framework program such as MICROSOFT® .NET Framework, or within any other type of program or service that handles data parallel operations in programs.

A data parallel operation partitions its input data collection into subcollections so that independent tasks of execution may process the separate subcollections in isolation. In one implementation, an example system is provided that re-writes a query to contain operations that include partitioning and merging. A parallel partitioning operation is performed on the input data to generate a plurality of initial partitions. A repartitioning operation may be performed on the initial partitions to generate a plurality of secondary partitions. Similarly, additional repartitioning operations may be performed on the secondary partitions, or subsequent ones, to generate additional pluralities of partitions. These secondary partitions are processed in parallel to generate a plurality of output sets (e.g., the query is executed in parallel using the plurality of secondary partitions). The output sets are merged back into a merged output set.

Figure 1:
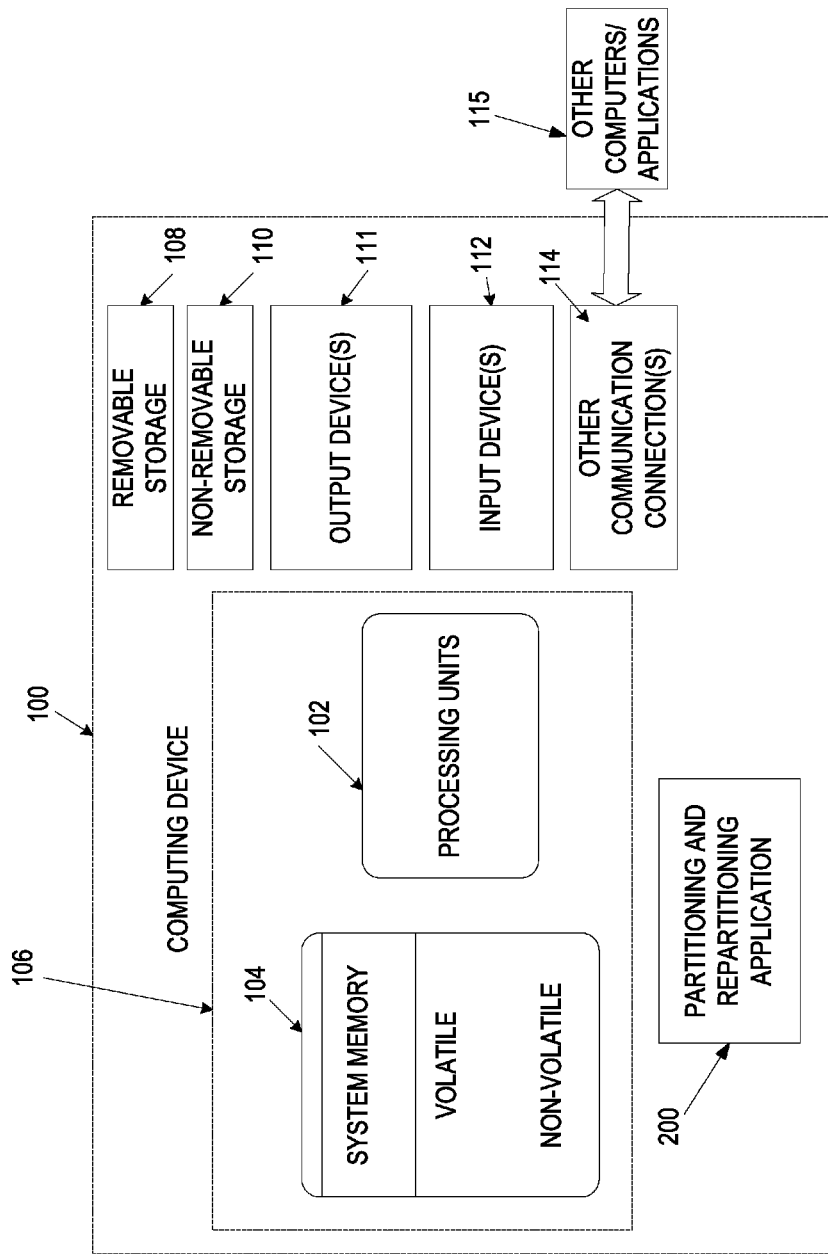
FIG. 1 is a block diagram illustrating a computer system according to one embodiment.

As illustrated in FIG. 1, an exemplary computer system that can be employed to implement one or more parts of an example system includes a computing device, such as computing device 100. In a basic configuration, computing device 100 typically includes processing units (i.e., processors) 102 and memory 104. Depending on the exact configuration and type of computing device, memory 104 may be volatile (such as RAM), non-volatile (such as ROM, flash memory, etc.), or some combination of the two. This basic configuration is illustrated in FIG. 1 by dashed line 106.

Computing device 100 may also have additional features/functionality. For example, computing device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

In one implementation, computing device 100 includes partitioning and repartitioning application 200. Partitioning and repartitioning application 200 is described in further detail below with reference to FIG. 2.

Figure 2:
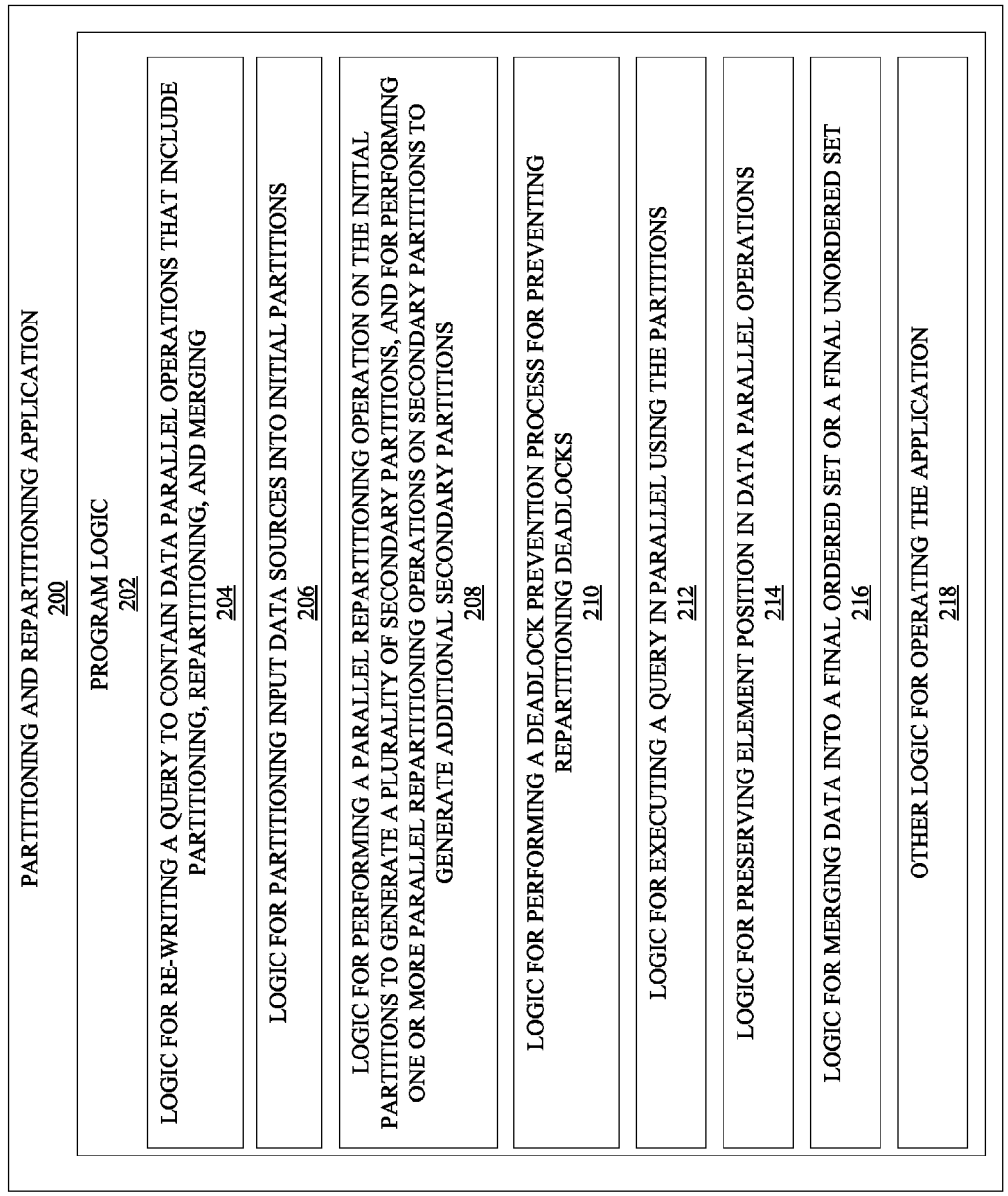
FIG. 2 is a diagrammatic view of a partitioning and repartitioning application for operation on the computer system illustrated in FIG. 1 according to one embodiment.

FIG. 2 is a diagrammatic view of one embodiment of a partitioning and repartitioning application 200 for operation on computer device 100 illustrated in FIG. 1. Partitioning and repartitioning application 200 is one of the application programs that reside on computing device 100. However, partitioning and repartitioning application 200 can alternatively or additionally be embodied as computer-executable instructions on one or more computers and/or in different variations than illustrated in FIG. 1. Alternatively or additionally, one or more parts of partitioning and repartitioning application 200 can be part of system memory 104, on other computers and/or applications 115, or other such suitable variations as would occur to one in the computer software art.

Partitioning and repartitioning application 200 includes program logic 202, which is responsible for carrying out some or all of the techniques described herein. Program logic 202 includes logic for re-writing a query to contain data parallel operations that include partitioning, repartitioning, and merging 204; logic for partitioning input data sources into initial partitions 206; logic for performing a parallel repartitioning operation on the initial partitions to generate a plurality of secondary partitions, and for performing one or more parallel repartitioning operations on secondary partitions to generate additional secondary partitions 208; logic for performing a deadlock prevention process for preventing repartitioning deadlocks 210; logic for executing a query in parallel using the partitions 212; logic for preserving element position in data parallel operations 214; logic for merging data into a final ordered set or a final unordered set 216; and other logic for operating the application 218.

Turning now to FIGS. 3-11 with continued reference to FIGS. 1-2, methods for implementing one or more implementations of partitioning and repartitioning application 200 are described in further detail. In some implementations, the methods illustrated in FIGS. 3-11 are at least partially implemented in the operating logic of computing device 100.

Figure 3:
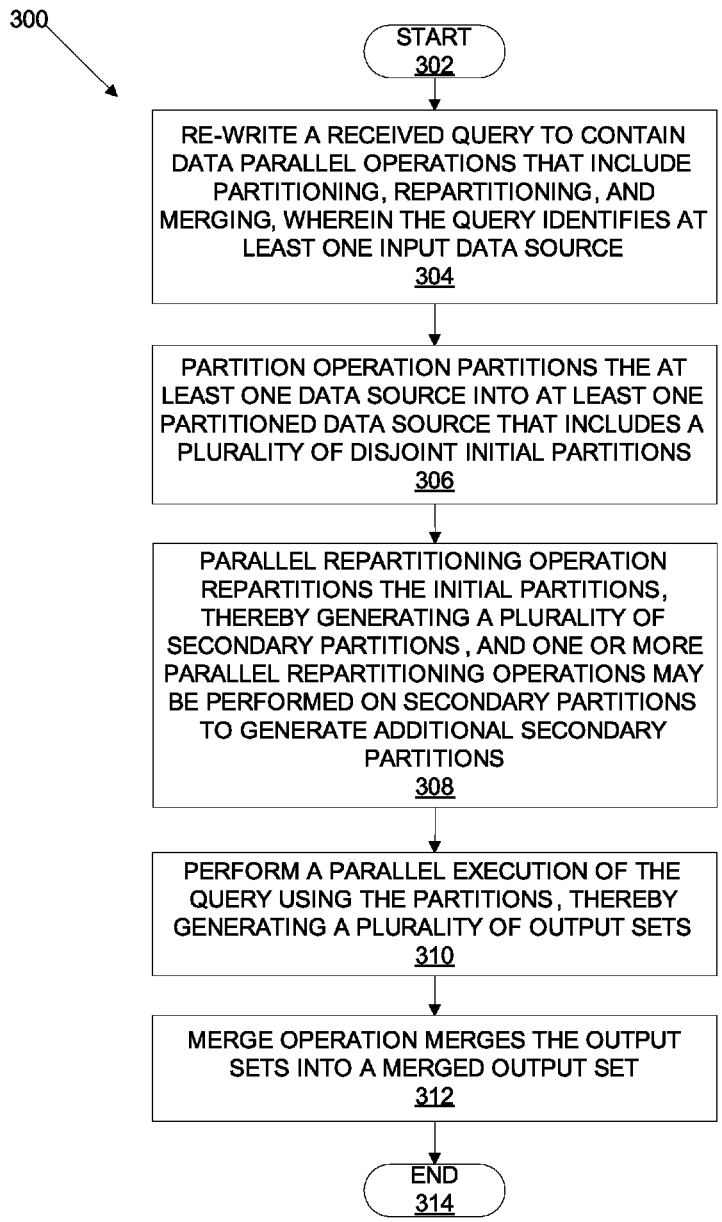
FIG. 3 is a high level flow diagram illustrating a method for partitioning and repartitioning input data sources according to one embodiment.

FIG. 3 is a high level flow diagram illustrating a method 300 for partitioning and repartitioning input data sources according to one embodiment. Method 300 begins at start point 302. At 304, a query is received and is rewritten to contain data parallel operations that include partitioning, repartitioning, and merging, wherein the query identifies at least one input data source. At 306, a partition operation partitions the at least one input data source into at least one partitioned data source that includes a plurality of disjoint initial partitions. At 308, a parallel repartitioning operation is performed on the initial partitions, thereby generating a plurality of secondary partitions, and one or more parallel repartitioning operations may be performed on secondary partitions to generate additional secondary partitions. At 310, a parallel execution of the query is performed using the secondary partitions, thereby generating a plurality of output sets. In one implementation, the secondary partitions are processed independently and in parallel at 310. At 312, a merge operation merges the output sets back into a merged output set. Method 300 ends at end point 314.

It will be understood by persons of ordinary skill in the art that the number of repartitioning operations performed by method 300 according to one embodiment, and in other methods described herein, may vary based on the particular query that is received. For some types of queries, no repartitioning is performed. For other types of queries, a single repartitioning operation is performed. For yet other types of queries, multiple repartitioning operations are performed.

For some operators, the input data sources can be arbitrarily partitioned into disjoint partitions, and the full query can be invoked on each disjoint partition as though it were an entirely distinct and unrelated query. A union operation can then be performed on the query results for all partitions to create a single, merged output. The partitioning and merge operations for these types of operators typically do not depend on properties of the data elements themselves. However, a few operators build output that depends on building relationships between elements in the data source. For some of these operators, the use of a simple, naïve approach to partitioning or repartitioning may yield incorrect results. A join operator, for example, builds pairs of elements from two separate data sources that share common keys, and a group-by operator, for example, groups all elements that share a common key into single-key-to-many-element pairs. These types of operators pose a challenge for parallel execution.

For sequential execution, a join operator may be executed by using a hash-join. With a hash-join, a hashtable is built out of one of the two data sources to be joined. It will be assumed for this description that the right subtree is chosen. The hashtable is probed for matching elements with elements from the other data source (e.g., the left subtree). For each element in the left subtree, all elements in the right subtree with an equal key value are located. This is simpler in the sequential case, because there is one hashtable, and the sequential execution can just perform the build followed by the probe, in that order. It is noted that similar attributes apply to other kinds of join algorithms, like merge joins, nested loop joins, etc. This example is not meant to be limiting in any way, but rather illustrate a possible use.

Parallel execution of a join operator is more difficult. A naïve approach would be to partition the left and right subtree into p partitions, and process the partitions in parallel and completely independently. However, this approach will likely yield incorrect results. Matching elements from both subtrees are paired up to yield correct results, but a naïve partitioning scheme might result in matching elements being in different partitions. If the matching elements are in different partitions, the elements may not get paired correctly. Partitioning and repartitioning operations can be used to address this problem for many kinds of query operators, for example join, group-by, distinct, and set operators, according to embodiments which are described in further detail below.

Figure 4:
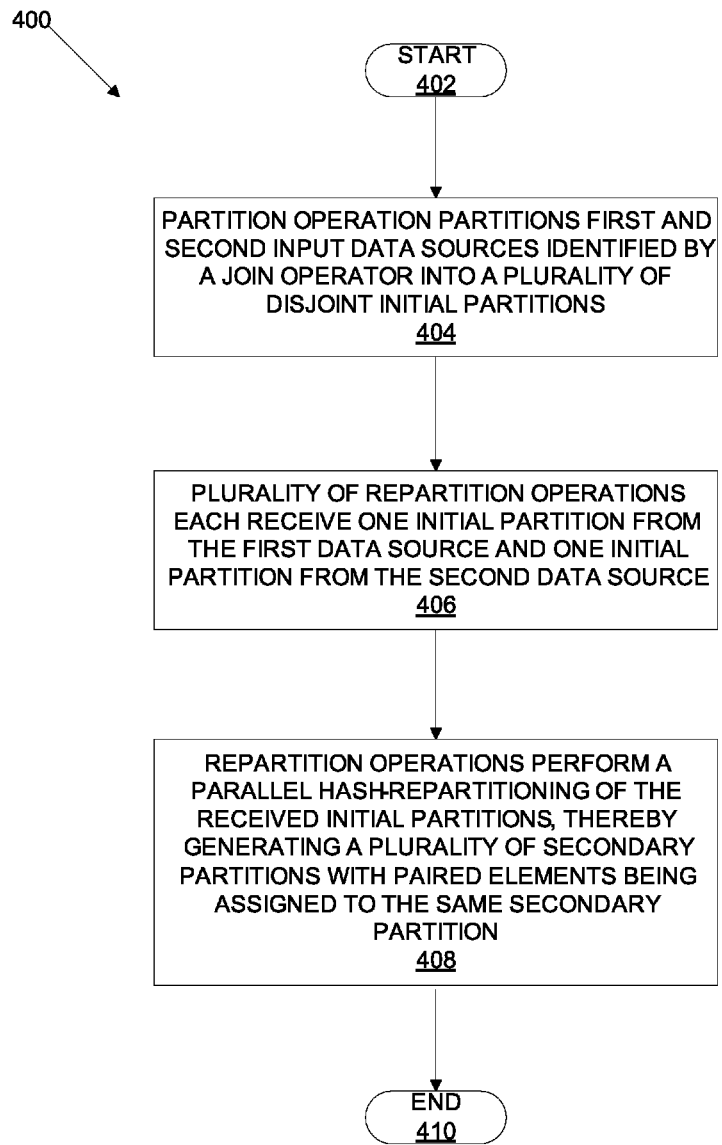
FIG. 4 is a flow diagram illustrating a method for partitioning and repartitioning input data sources for a join operator according to one embodiment.

FIG. 4 is a flow diagram illustrating a method 400 for partitioning and repartitioning input data sources for a join operator according to one embodiment. Method 400 begins at start point 402. At 404, a partition operation partitions first and second input data sources identified by a join operator into a plurality of disjoint initial partitions. At 406, a plurality of repartition operations each receive one initial partition from the first data source and one partition from the second data source. In one embodiment, each repartition operation is executed by and corresponds to a different processor in a multi-processor system. At 408, the repartition operations perform a parallel hash-repartitioning of the received initial partitions, thereby generating a plurality of secondary partitions with paired elements being assigned to the same secondary partition. In one embodiment, at 408, for every element in a received initial partition, the repartition operation computes a hash from the element's key, and calculates the modulus of it with the number of partitions, p, to get a assignment value in the range [0, p−1]. This assignment value determines to what partition the element will be assigned. Since the property used for the join is also used to compute the hash, paired elements will be assigned to the same secondary partition. Method 400 ends at end point 410.

Method 400 can provide several benefits. First, the secondary partitions generated at 408 are completely independent in one embodiment, so subsequent operations can happen in parallel with no interference. Second, in one embodiment there is no complex merge logic that is needed at the end of the processing. Rather the union of the output for each secondary partition is the correct output of the total query. Third, since each repartition operation has its own hashtable data structure in one embodiment, the contents of the hashtable will likely fit into each processor's cache and stay there for the duration of the join. Because of the random access nature of hashtables with respect to locality, this can reduce the number of cache misses.

In one embodiment, both of the data sources are scanned during the repartitioning at 408, and keys are calculated for all elements, in order to determine, for each element, into what secondary partition it will be assigned. The keys may need to be recalculated later during execution of the join. In one embodiment, the calculated keys are saved to avoid this recalculation. In another embodiment, the keys for one data source are saved, but keys for the other data source are not saved.

In some cases, a query may include multiple operators that are related to each other. For example, a query may include a first join operator that generates an output that is the input to a second join operator. One embodiment provides a method for dynamically repartitioning data streams "on the fly" to deal with such situations. In one embodiment, method 400 is performed for each of the join operators in such a query.

In the embodiment illustrated in FIG. 4, an initial partitioning (e.g., calculating disjoint regions of the input sources) is performed at 404 before the secondary partitions are generated at 408 based on hashing. This allows the calculation of keys to happen in parallel, thereby avoiding "sequentializing" the algorithm. Example methods for generating the secondary partitions in parallel are described below with reference to FIGS. 5-7.

Figure 5:
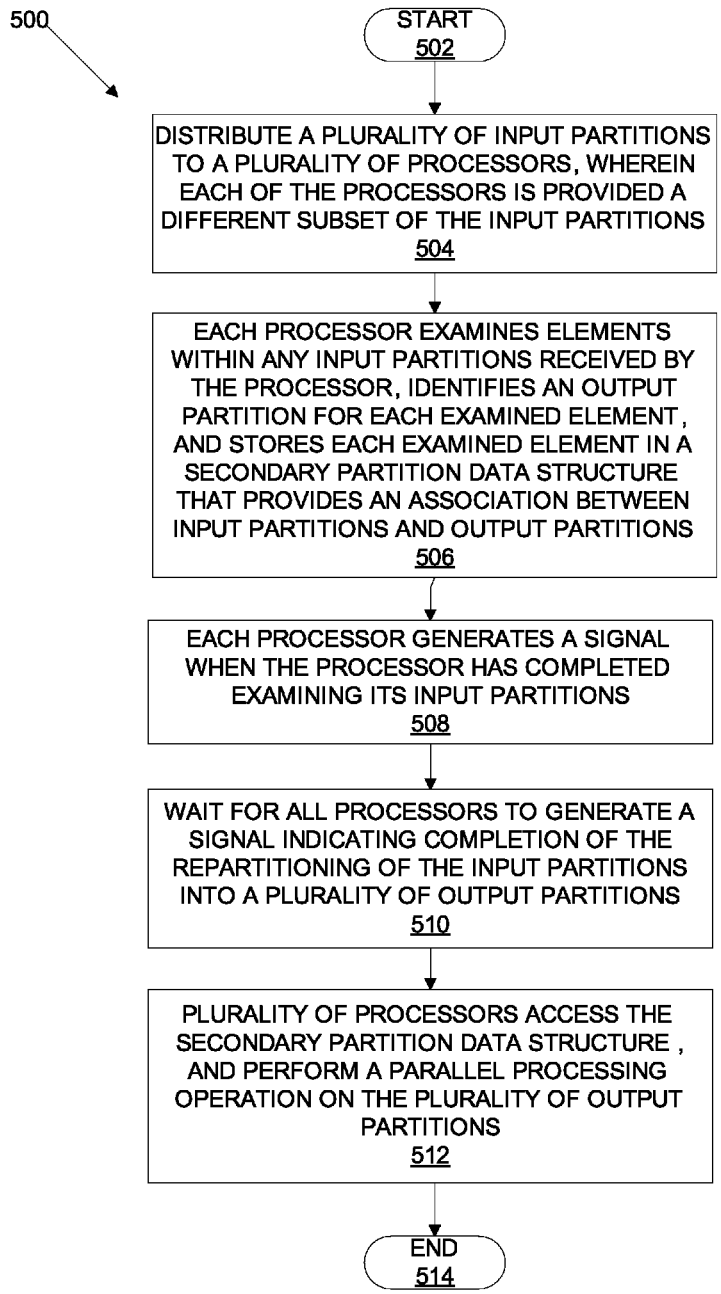
FIG. 5 is a flow diagram illustrating a method for performing a parallel repartitioning of initial partitions according to one embodiment.

FIG. 5 is a flow diagram illustrating a method 500 for performing a parallel repartitioning of input partitions (e.g., initial partitions or secondary partitions) according to one embodiment. Method 500 begins at start point 502. At 504, a plurality of input partitions is distributed to a plurality of processors. In one embodiment, each of the processors is provided a different subset of the input partitions. At 506, each of the processors examines elements within any input partitions received by the processor, identifies an output (secondary) partition for each examined element, and stores each examined element in a secondary partition data structure that provides an association between input partitions and output partitions. At 508, each of the processors generates a signal when the processor has completed examining its input partitions. At 510, method 500 waits until all processors have generated a signal indicating completion of the repartitioning of the input partitions into a plurality of output partitions. At 512, the plurality of processors access the elements stored in the secondary partition data structure, and perform a parallel processing operation on the plurality of output partitions (e.g., execute a query using the output partitions as input). Method 500 ends at end point 514.

In one embodiment of method 500, a synchronizing barrier is used (at 510) so that all processors identify a destination (e.g., output or secondary) partition for all elements, and then after all of the processors have completed the generation of the destination partitions, the processors proceed with the remaining execution of the operator (e.g., join operator). In another embodiment, when a processor finds elements in an input partition that are to be assigned to that processor's output partition, the processor proceeds to process those elements without waiting for completion of the repartitioning.

Figure 6:
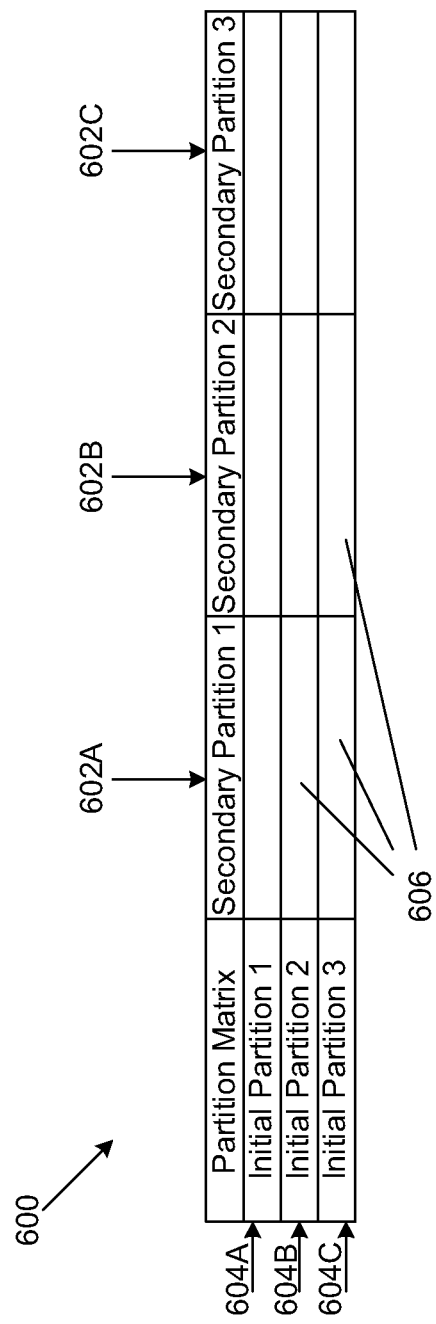
FIG. 6 is a diagram illustrating a matrix for use in the method illustrated in FIG. 5 according to one embodiment.

In one embodiment, the secondary partition data structure in method 500 is a p by p matrix, where p according to one embodiment represents the number of processors in the system. In another embodiment, p represents a constant times the number of processors in the system. FIG. 6 is a diagram illustrating an example embodiment of a matrix 600 for use in method 500. In the illustrated example embodiment, p is equal to three and matrix 600 includes three columns 602A-602C, three rows 604A-604C, and nine cells 606. Each row of matrix 600 corresponds to one of the initial partitions, and each column of matrix 600 corresponds to one of the secondary partitions (i.e., destination partitions). Each cell 606 in matrix 600 holds a set of data elements from the initial partitions. Before the synchronizing barrier, each processor examines the elements in its initial partition and adds the elements to matrix 600 in the appropriate column. After the barrier, each processor traverses its corresponding column in matrix 600 and builds a hash table from the elements. The matrix approach can avoid the locking associated with the shared hash table. In addition, with the matrix approach, load balance can be observed by summing the elements in a column. If there is a significant load imbalance, elements in the matrix are redistributed in one embodiment to provide a more even distribution of elements amongst the processors.

Figure 7:
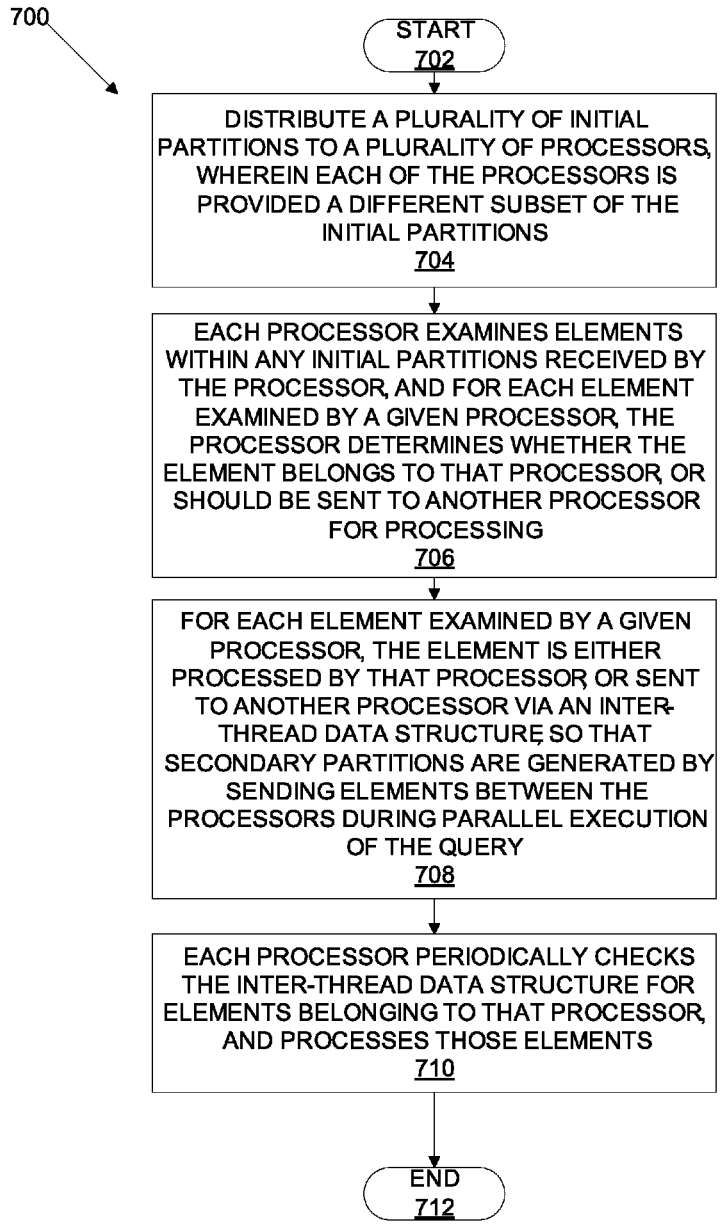
FIG. 7 is a flow diagram illustrating a method for performing a parallel repartitioning of initial partitions according to another embodiment.

FIG. 7 is a flow diagram illustrating a method 700 for performing a parallel repartitioning of initial partitions according to one embodiment. Method 700 begins at start point 702. At 704, a plurality of initial partitions is distributed to a plurality of processors. In one embodiment, each of the processors is provided a different subset of the initial partitions. At 706, each of the processors examines each element within any initial partitions received by the processor, and for each element examined by a given processor, the processor determines whether the element belongs to that processor, or should be sent to another processor for processing. At 708, for each element examined by a given processor, the element is either processed by that processor, or sent to another processor via an inter-thread data structure, based on the determination at 706, so that the secondary partitions are generated by sending elements between the processors during parallel execution of the query. At 710, each processor periodically checks the inter-thread data structure for elements belonging to that processor, and processes those elements. Method 700 ends at end point 712.

In one form of method 700, the processing of an operator, such as a join operator, and the generation of the secondary partitions occurs at the same time, and the processors (or threads) communicate with each other during the generation of the secondary partitions. For example, if thread 0, which is processing an initial partition 0, finds an element that belongs to thread 1 (e.g., secondary partition 1), then in one embodiment, thread 0 sends the element to thread 1 via the inter-thread data structure. In this embodiment, each thread periodically processes its input channel in the inter-thread data structure. The decision of when to periodically process the input channel according to one embodiment is based on heuristics.

Assuming an even distribution of input elements, and any of the p threads can send an input element to any of the other p−1 threads, the probability that any given input element is to be sent to another thread is (p−1)/p. Sending incurs synchronization. So as p grows, the probability of finding an element that belongs to another thread approaches the limit of 100%. Thus, with more and more processors, more and more synchronization occurs during the computation.

Repartitioning techniques for generating the secondary partitions (e.g., method 500 and method 700) were discussed above. In one embodiment, a plurality of repartitioning techniques are provided, and when a repartitioning operation is to be performed, one of the repartitioning techniques is automatically selected based on statistics from previous repartitioning operations. One form of this embodiment is described in further detail below with reference to FIG. 8.

Figure 8:
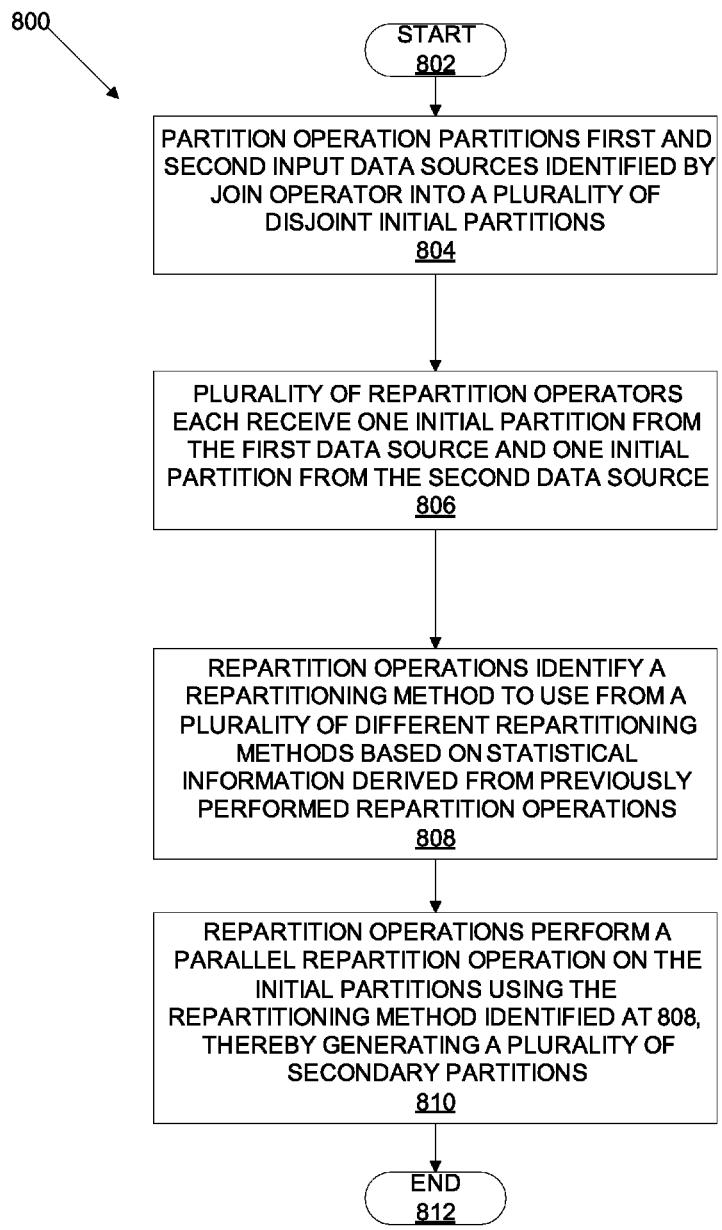
FIG. 8 is a flow diagram illustrating a method for automatically selecting a repartitioning method based on statistical information according to one embodiment.

FIG. 8 is a flow diagram illustrating a method 800 for automatically selecting a repartitioning method based on statistical information according to one embodiment. Method 800 begins at start point 802. At 804, a partition operation partitions first and second input data sources identified by a join operator into a plurality of disjoint initial partitions. At 806, a plurality of repartition operations each receive one initial partition from the first data source and one initial partition from the second data source. At 808, the repartition operations identify a repartitioning method to use from a plurality of different repartitioning methods based on statistical information derived from previously performed repartition operations. At 810, the repartition operations perform a parallel repartitioning operation on the initial partitions using the repartitioning method identified at 808, thereby generating a plurality of secondary partitions. Method 800 ends at end point 812.

As mentioned above, the group-by operator is another operator that can result in incorrect output results if simple, naïve partitioning is used. For example, assume that an input is the data set {"foo", "foo", . . . 7 other elements . . . , "foo"}, and that this input is naively partitioned into two partitions of five contiguous elements apiece (i.e., [0-4], [5-9]). If an identity function is used to select keys from elements, and then the output is merged (e.g., a union of the intermediary results), the final result would include two pairs for the key "foo": one from the first partition, containing two values; the other from the second partition, containing one value, which is an incorrect result. The correct result would be one pair that contains the three values from all partitions. The same repartitioning techniques used for join operators described above can be used to ensure parallel group-by operators produce the correct results.

One approach for partitioning for a group-by operator is to let all partitions operate on disjoint sets of data, possibly containing elements with duplicate keys, and then performing a final consolidation stage before returning data. This approach has the drawback of increasing the latency and working set of the query. A single key-to-many-element grouping is not returned until all results are known, so one slow partition could slow down the whole query. The final consolidation stage can also be costly and difficult to parallelize.

Figure 9:
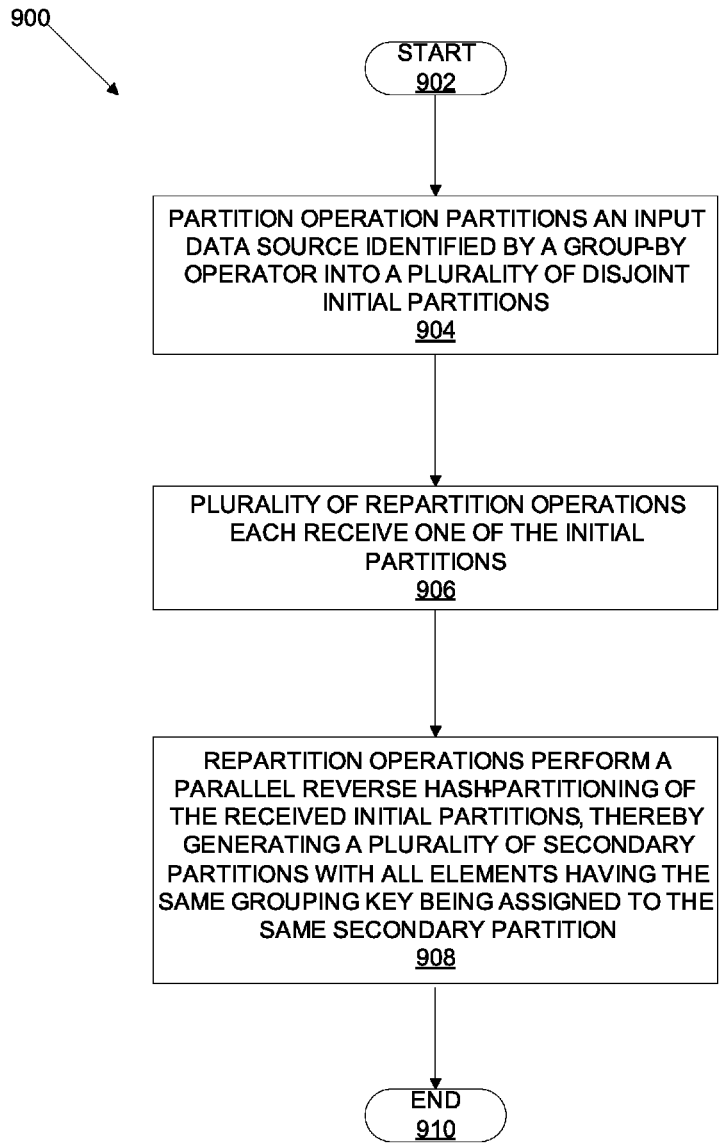
FIG. 9 is a flow diagram illustrating a method for partitioning and repartitioning an input data source for a group-by operator according to one embodiment.

FIG. 9 is a flow diagram illustrating a method 900 for partitioning and repartitioning an input data source for a group-by operation according to one embodiment. Method 900 begins at start point 902. At 904, a partition operation partitions an input data source identified by a group-by operator into a plurality of disjoint initial partitions. At 906, a plurality of repartition operations each receive one of the initial partitions. At 908, the repartition operations perform a parallel reverse hash-repartitioning of the received initial partitions, thereby generating a plurality of secondary partitions with all elements having the same grouping key being assigned to the same secondary partition. Method 900 ends at end point 910.

In one embodiment, for the reverse hash-repartitioning performed at 908, a hashing scheme is used on the keys to assign each intermediary key grouping to a particular partition. This results in all intermediary groupings for a particular key being "sent" to a single partition for consolidation. Since each partition is responsible for consolidating only a subset of keys in the set in one embodiment, assuming an even distribution, the amount of work will also be evenly distributed.

Note that the above-described partitioning and repartitioning methods for join operators, are also applicable to union operators (e.g., union, intersection, exception), and that the methods for group-by operators are also applicable to the distinct operator.

As input data is moved around between partitions, it can be difficult to ensure that ordering is preserved when desired. One embodiment provides a method for partitioning and repartitioning input data sources in a manner that preserves ordering regardless of the number of repartitioning operations that occur. For order preservation to work correctly, there are two things that happen in one embodiment. First, keys are "remembered" for as long as the system runs in parallel. This allows many disparate partitions to be brought back into one correctly ordered stream during the merge. Note that ordinal order preservation is just a special case of the more general order preservation infrastructure in which element indices comprise the keys rather than arbitrarily selected object fields, etc. Second, elements within the individual streams of data arrive at the final merge in the correct order, in a monotonically increasing (i.e., for ascending) or decreasing (i.e., for descending) sequence. For example, if the elements {0,1,2} are distributed among two order preserving partitions, then the allowable distributions are [1={ }, 2={0,1,2}], [1={0}, 2={1,2}], [1={0,1}, 2={2}], [1={0,2}, 2={1}], and distributions of these in which 1 and 2's contents are swapped.

During repartitioning according to one embodiment, elements from an initial partition are scattered to any of p secondary partitions. For example, assume an initial partition A with an element 0 and an initial partition B with an element 1, and based on a hash repartitioning algorithm, the repartition operators both decide to send the two elements to secondary partition C. Depending on the order in which the secondary partition C receives these elements, the output might be {0,1} or {1,0}. Depending on whether ascending or descending order preservation is used, only one of the sequences is correct.

Figure 10:
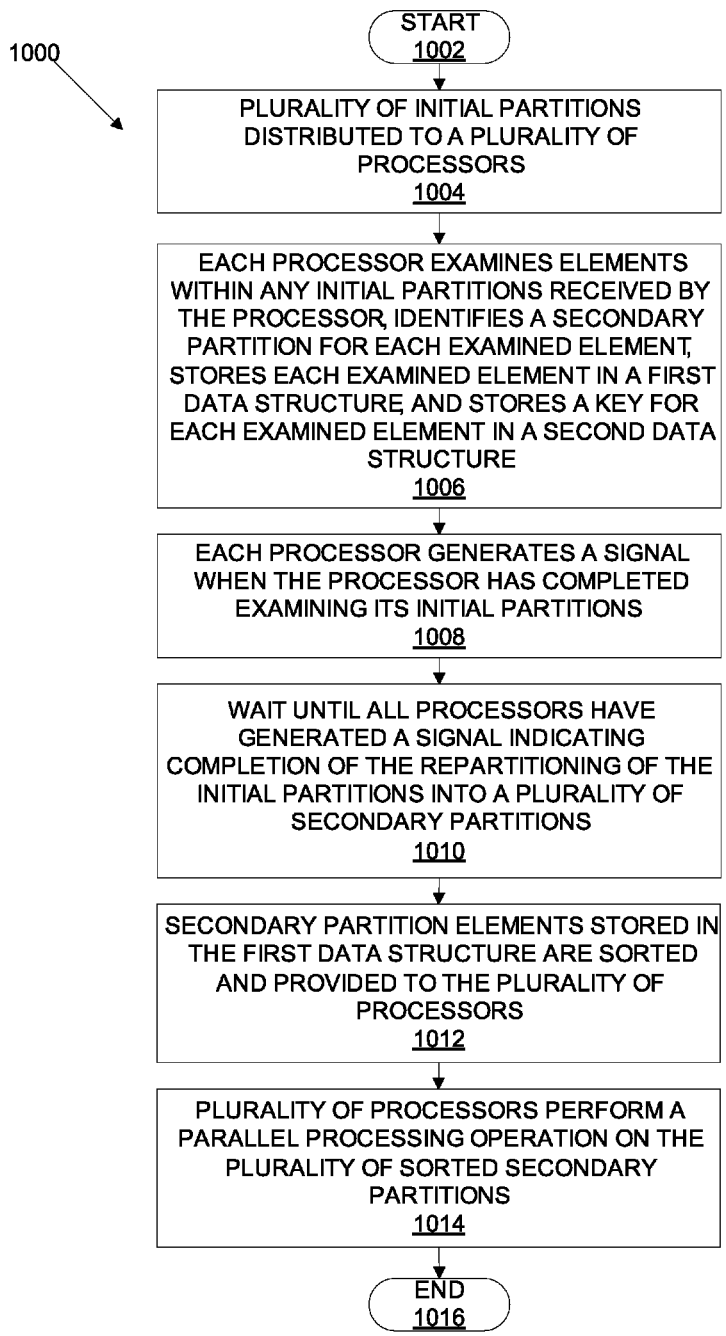
FIG. 10 is a flow diagram illustrating a method for preserving the order of elements during partitioning and repartitioning operations according to one embodiment.

FIG. 10 is a flow diagram illustrating a method 1000 for preserving the order of elements during partitioning and repartitioning operations according to one embodiment. Method 1000 begins at start point 1002. At 1004, a plurality of initial partitions is distributed to a plurality of processors. At 1006, each of the processors examines the elements within any initial partitions received by the processor, identifies a secondary partition for each examined element, stores each examined element in a first data structure, and stores a key for each examined element in a second data structure. At 1008, each of the processors generates a signal when the processor has completed examining its initial partitions. At 1010, the method waits until all processors have generated a signal indicating completion of the repartitioning of the initial partitions into a plurality of secondary partitions. At 1012, the secondary partition elements stored in the data structure are sorted and provided to the plurality of processors. At 1014, the plurality of processors performs a parallel processing operation on the plurality of sorted secondary partitions (e.g., the processors perform a parallel execution of a query using the sorted secondary partitions as input). The method 1000 ends at end point 1016.

In one embodiment, the first data structure used for storing secondary partition information in method 1000 is a p by p matrix, such as matrix 600 (FIG. 6). In one embodiment, the second data structure used for storing keys in method 1000 is also a p by p matrix. Each row of the key matrix corresponds to one of the initial partitions, and each column of the matrix represents one of the secondary partitions (i.e., destination partitions). Each cell in the matrix holds a set of keys. In one embodiment, when an element is found in initial partition m for secondary partition n, the re-partitioning operation will not only insert the element into the (n,m)th cell of the element matrix, but it will also insert a key for that element into the (n,m)th cell of the key matrix.

In one embodiment, the sorting performed at 1012 is performed by using a heap of size p. The best element from each cell in the first row of the element matrix is inserted into the heap. The best element in the heap is then identified, the secondary partition, n, from which the identified element came is remembered, and the identified element is provided to the processor responsible for processing the nth secondary partition. The next best element from the cell from which the identified element came is then inserted into the heap, and the process is repeated until all elements in the first row have been sorted. The elements in the remaining rows of the element matrix are then sorted and provided to the processors in the same manner.

If the hash repartitioning operation happens after the order is established (e.g., ordinal indexes need to be preserved, or the sort appears earlier in the query), the earlier operations can be transformed into a "key memorization" operation. The final merge at the end of a query turns into a full parallel sort on the already partitioned input, using the memorized keys. In one embodiment, the hash repartitioning operation records (key, value) pairs instead of just (value) so that the final merge has access to the sort key information.

With some approaches to repartitioning, deadlocks can occur when multiple repartitioning operations occur in the same stream of operators. One embodiment provides a method for partitioning and repartitioning input data sources in a manner that prevents such deadlocks. In one embodiment, the method for preventing deadlocks employs a vertical reentrancy technique.

The following is an example of a possible deadlock situation. Assume that there are three operations A, B, and C, replicated across two partitions 0 and 1 (e.g., A0, A1, B0, B1, C0, and C1), and that C0 pulls from B0 which pulls from A0, and so on. Assume that there are two dedicated execution resources E0 and E1 to execute the two partitions (e.g., E0 handles A0, B0, and C0, and E1 handles A1, B1, and C1). Assume further that the following situation occurs: in running A0, E0 becomes blocked (e.g., A0 found some data for B1, but B1's input buffer is full, so E0 waits), and in running B1, E1 becomes blocked (e.g., B1 found some data for C0, but C0's input buffer is full, so E1 waits). This situation results in a deadlock. E0 is waiting for E1 (i.e., A0 is waiting for B1 to free up space), and E1 is waiting for E0 (i.e., B1 is waiting for C0 to free up space).

Deadlocks can be prevented at the same "level". Assume that E0 blocks on A0 putting data into B1's buffer, and E1 blocks on A1 putting data into B0's buffer. The deadlock is solved in one embodiment by causing EN (where N is an index for identifying different execution resources) to wake up either when space is made in BD's buffer (where D is the destination for some element), or when a new element is placed into BN's buffer. In the latter case, AN then assumes responsibility for transferring execution of EN straight to BN. This is referred to as a reentrancy-based solution.

Deadlocks can also be prevented for arbitrary levels. In one embodiment, a deadlock is solved by causing EN, when it blocks, to also wake up when any operator's buffer in its partition receives a new element (e.g., in the above example, the solution is changed so that E0 waits for either B1's buffer to have room, or an element to be enqueued into B0's or C0's buffer (and similarly for E1)).

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer-readable storage medium storing computer-executable instructions for performing a method comprising:
    re-writing a query to contain data parallel operations that include partitioning and merging, wherein the query identifies at least one input data source that includes a plurality of data elements;
    partitioning the at least one input data source into a plurality of initial partitions;
    performing a parallel repartitioning operation on the initial partitions, thereby generating a plurality of secondary partitions, wherein performing the parallel repartitioning operation comprises storing each data element of the at least one input data source in a matrix that identifies for each data element an initial partition for the data element and a secondary partition for the data element; and performing a parallel execution of the query using the secondary partitions identified by the matrix, thereby generating a plurality of output sets.

2. The computer-readable medium of claim 1, wherein the method further comprises:
merging the plurality of output sets into a merged output set.

3. The computer-readable medium of claim 1, wherein the query includes a join operator that identifies first and second input data sources, and wherein partitioning the at least one data source comprises:
partitioning the first input data source into a first plurality of initial partitions; and
partitioning the second input data source into a second plurality of initial partitions.

4. The computer-readable medium of claim 3, wherein performing a parallel repartitioning operation comprises:
performing a parallel repartitioning operation on the first plurality of initial partitions, thereby generating a first plurality of secondary partitions; and
performing a parallel repartitioning operation on the second plurality of initial partitions, thereby generating a second plurality of secondary partitions.

5. The computer-readable medium of claim 4, wherein the first and the second plurality of secondary partitions are generated based on a join key specified by the join operator.

6. The computer-readable medium of claim 1, wherein the query includes a group-by operator, and wherein the first plurality of secondary partitions is generated based on a group-by key specified by the group-by operator.

7. The computer-readable medium of claim 1, wherein the plurality of secondary partitions is generated using a hash partitioning technique.

8. The computer-readable medium of claim 1, wherein the method further comprises:
performing a parallel repartitioning operation on the plurality of secondary partitions.

9. The computer-readable medium of claim 1, wherein the plurality of secondary partitions is generated based on processor load balance.

10. The computer-readable medium of claim 1, wherein the query includes a plurality of operators, and wherein a parallel repartitioning operation is performed for each of the operators.

11. The computer-readable medium of claim 1, wherein the method further comprises:
performing an order preservation process during the partitioning and repartitioning.

12. The computer-readable medium of claim 1, wherein performing a parallel repartitioning operation comprises:
providing the plurality of initial partitions to a plurality of processors, wherein each of the processors is provided a different one of the initial partitions; and
examining each element within the initial partitions with the plurality of processors to identify a secondary partition for each element.

13. The computer-readable medium of claim 12, wherein performing a parallel repartitioning operation further comprises:
generating a signal with each processor when the processor has completed examining its initial partition.

14. The computer-readable medium of claim 13, wherein performing a parallel repartitioning operation further comprises:
waiting for all processors to generate the signal thereby indicating completion of the repartitioning of the initial partitions into the plurality of secondary partitions before performing the parallel execution of the query using the secondary partitions.

15. The computer-readable medium of claim 12, wherein the matrix comprises a p×p matrix, where p represents a total number of processors in the plurality of processors.

16. The computer-readable medium of claim 1, wherein the method further comprises:
performing a deadlock prevention process to prevent partitioning deadlocks.

17. The computer-readable medium of claim 1, and further comprising:
providing a plurality of repartitioning methods;
selecting one of the repartitioning methods based on statistical information; and
performing the parallel repartitioning operation using the selected repartitioning method.

18. A method for performing a parallel execution of a query, the method comprising:
receiving a query that identifies at least one input data source, wherein the query includes an operator that depends on building relationships between elements in the at least one data source;
partitioning the at least one input data source into at least one partitioned data source comprising a plurality of initial partitions;
performing a parallel repartitioning operation on the at least one partitioned data source based on a key specified by the operator, thereby generating a plurality of secondary partitions, wherein performing the parallel repartitioning operation comprises storing each element of the at least one input data source in a matrix that identifies for each element an initial partition for the element and a secondary partition for the element; and
executing the query in a parallel manner using the plurality of secondary partitions identified by the matrix.

19. A computer-readable storage medium storing computer-executable instructions for performing a method comprising:
partitioning an input data source into a plurality of initial partitions;
providing the plurality of initial partitions to a plurality of processors, wherein each of the processors is provided a different one of the initial partitions;
examining each element within the initial partitions with the plurality of processors to identify a secondary partition for each element; and
storing each element within the initial partitions in at least one matrix, wherein the at least one matrix identifies for each element an initial partition for the element and a secondary partition for the element, wherein the at least one matrix comprises a p×p matrix, where p represents a total number of processors in the plurality of processors, wherein the at least one matrix includes a plurality of rows and a plurality of columns, and wherein each row corresponds to one of the initial partitions and each column corresponds to one of the secondary partitions.

20. The computer-readable medium of claim 15, wherein the matrix includes a plurality of rows and a plurality of columns, and wherein each row corresponds to one of the initial partitions and each column corresponds to one of the secondary partitions.

* * * * *